United States Patent [19]

Emmert, Jr. et al.

[11] Patent Number: 5,094,105

[45] Date of Patent: Mar. 10, 1992

[54] OPTIMIZED CONVECTION BASED MASS AIRFLOW SENSOR

[75] Inventors: Charles G. Emmert, Jr., Grand Blanc, Mich.; Edward J. Martin, Luxembourg-Belair, Luxembourg

[73] Assignee: General Motors Corporation, Detroit, Mich.

[21] Appl. No.: 570,107

[22] Filed: Aug. 20, 1990

[51] Int. Cl.$^5$ ............................................. G01F 1/68
[52] U.S. Cl. ......................................................... 73/204.25
[58] Field of Search ............ 73/204.25, 204.26, 204.27; 338/25, 28, 262–267, 270, 286, 302

[56] References Cited

U.S. PATENT DOCUMENTS

| | | | |
|---|---|---|---|
| 4,279,147 | 7/1981 | Djorup | 73/189 |
| 4,494,405 | 1/1985 | Oosuga et al. | 73/204 X |
| 4,513,615 | 4/1985 | Sato et al. | 73/204 |
| 4,554,829 | 11/1985 | Sumal | 73/204.26 |
| 4,559,814 | 12/1985 | Sato et al. | 73/118 |
| 4,565,091 | 1/1986 | Ito et al. | 73/118 |
| 4,587,842 | 5/1986 | Handtmann | 73/204 |
| 4,624,137 | 11/1986 | Johnson et al. | 73/204 |
| 4,672,847 | 6/1987 | Uchiyama et al. | 73/204 |
| 4,912,975 | 4/1990 | Ohta et al. | 73/204.26 |

*Primary Examiner*—Herbert Goldstein
*Attorney, Agent, or Firm*—Robert M. Sigler

[57] ABSTRACT

A cylindrical heated airflow sensor for a constant temperature anenometer has a solid or tubular fused silica substrate with leads or terminals connected to each end. The sensor has a central heated section densely wound with resistive wire or covered with a resistive film, and an unheated section between the heated section and each terminal. Due to low heat conductivity of the substrate, the unheated section insulates the heated section from the terminals to improve the accuracy of the sensor at low airflow rates.

5 Claims, 2 Drawing Sheets

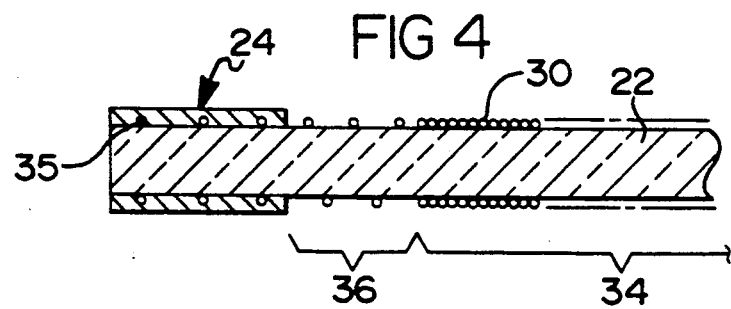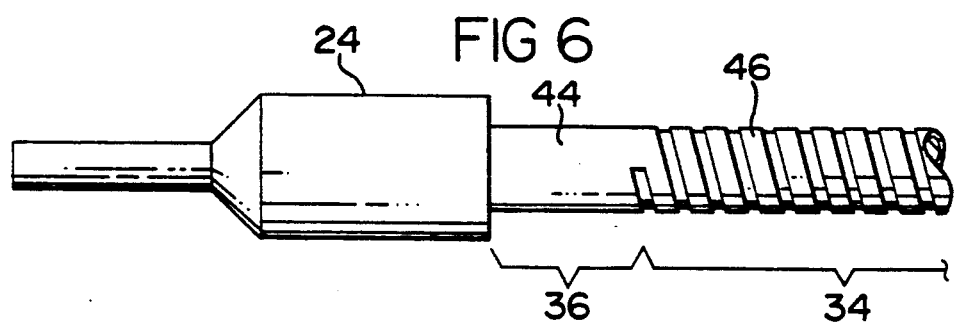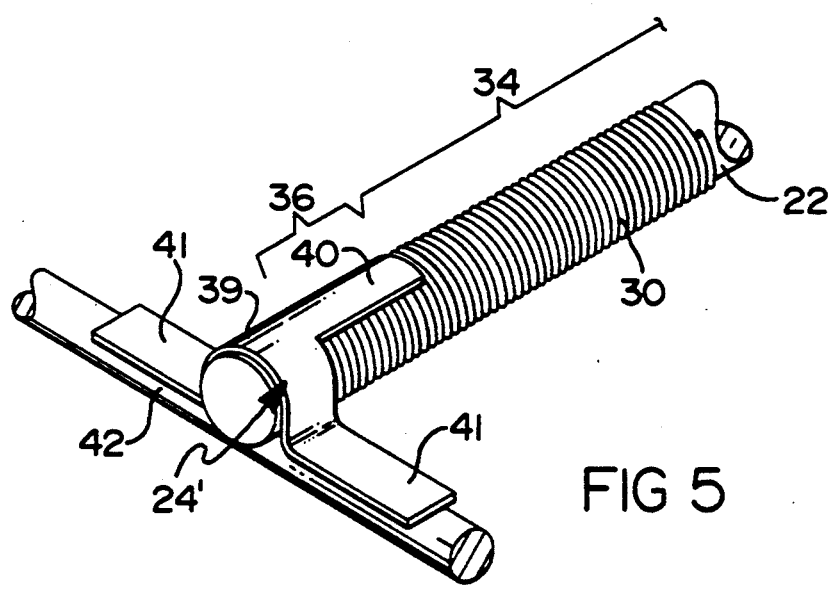

OPTIMIZED CONVECTION BASED MASS AIRFLOW SENSOR

FIELD OF THE INVENTION

This inveniton relates to a heated sensor element for an air flow meter and particularly to such an element having a wide dynamic range.

BACKGROUND OF THE INVENTION

Mass air flow meters used in automotive vehicles often are of the constant temperature anemometer type. In these meters, a sensing element is electrically heated to a constant temperature differential above ambient air temperature. Heat is convectively removed from the element by the airflow and the curren flowing in the element replaces the heat lost by convection. As the mass air flow varies, the current required to maintain the requisite temperature also varies such that the current is a known function of the mass air flow.

Since the convective heat loss is not the only loss mechanism, inaccuracies can creep into airflow measurements. Heat is also removed from the sensor by radiation to the surroundings and conduction to the sensor support. Radiation loss is a function of area of the heated element and can be minimized by making the sensor very small. The heat loss by conduction, on the other hand, has been a source of inaccuracy in such meters, particularly since it varies in accordance with air flow and also in accordance with the temperature of the supporting structure. In the case of a cylindrical sensor body with terminal fittings on the ends, heat is conducted from the sensor to the terminal fittings and thence to the support which mounts the fittings. At high airflow rates the heat is removed convectively from the terminal fittings so that they do not effectively transfer heat to the supports but at low airflow rates the terminals and support become warm. Thus the sensor element effectively becomes larger at the low rates and the current to airflow function becomes skewed. This restrists the dynamic range for accurate operation to higher airflow rates. To avoid the meter inaccuracies engendered by this thermal characteristic, it is desirable to account for the heat loss by conduction or to prevent heat loss by conduction.

An important characteristic of a heat sensor is its response time. A sudden change of air flow or ambient temperature should be quickly reflected in the heating current. When the sensor has a large mass, it does not change temperature as fast as a small mass sensor. When sensor terminals are heated by conduction they effectively add to the mass and to the response time. Thus, optimizing response time is another reason for preventing heat loss from the heated element to the terminals.

The desirability of controlling thermal characteristics of such sensors has been recognized in U.S. Pat. No. 4,587,842 to Handtmann. There, the heater coil is wound on a massive support and is bounded at either end by an auxiliary heater controlled to the same temperature as the heater coil. The auxiliary heaters maintain the temperature of the support so that there is no heat transfer from the coil to the support, resulting in fast response.

U.S. Pat. No. 4,559,814 to Sato et al describes the heat sink effect of the terminal leads fastened in the ends of a tubular support for a heated sensor and particularly the resulting temperature variation along the length of the support and the coil. A uniform temperature is achieved by winding the resistor onto the support coarsely at the center and densely at the ends. The resistor is wound as close to the end of the support as is practical. This patent, like Handtmann does not teach how to prevent or even to compensate for the loss of heat to the leads or terminals.

SUMMARY OF THE INVENTION

It is therefore an object of the invention to provide a heated airflow sensor which is not subject to significant error due to conductive heat loss. It is another object to provide such a sensor which has minimal heat loss to terminals or supports.

The invention is carried out by a convection based airflow sensing element having a fast response comprising: a cylindrical substrate of low thermal conductivity material, electrical terminals attached to the ends of the substrate, a resistance heating element on the substrate between the terminals to define a heating zone and spaced from the terminals to define an isolation zone between the element and each terminal, whereby the heating element directly heats the substrate in the heating zone and the isolation zones thermally insulate the directly heated substrate from the terminals, and means for electrically coupling the heating element to the terminals across the isolation zone.

BRIEF DESCRIPTION OF THE DRAWINGS

The above and other advantages of the invention will become more apparent from the following description taken in conjunction with the accompanying drawings wherein like references refer to like parts and wherein:

FIG. 4 is a partial cross section of a heated airflow sensor according to a second embodiment of the invention, and FIG. 5 is a partial isometric view of a heated airflow sensor according to a third embodiment of the invention, and FIG. 6 is a partial side view of a heated airflow sensor according to a fourth embodiment of the invention.

DESCRIPTION OF THE INVENTION

Figure 1:
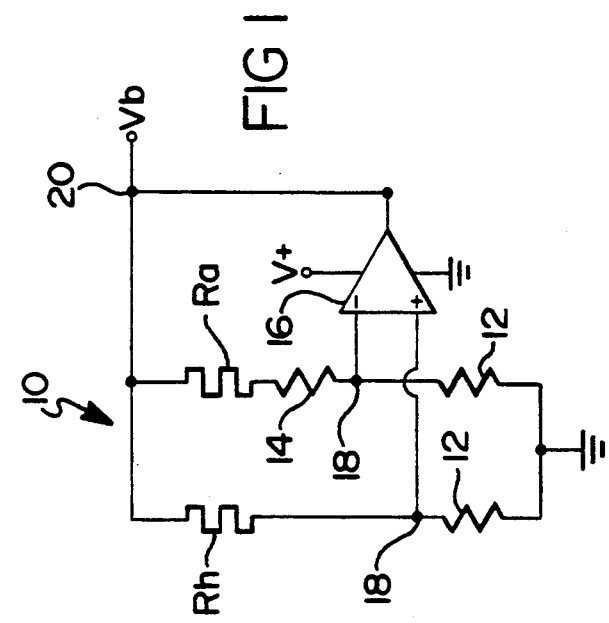
FIG. 1 is a schematic diagram of a conventional airflow meter circuit.

Hot element anemometers frequently use a Wheatstone bridge configuration for the sensing elements. As shown in FIG. 1, it is commonplace to employ a flow sensing resistor Rh in one leg of a bridge 10 and an ambient temperature sensing resistor Ra in another leg of the bridge. Resistors 12 in the lower arms of the bridge complete the bridge configuration and a resistor 14 in series with the ambient sensing resistor Ra is useful in bridge balance and calibration. A differential amplifier 16 has its inputs coupled to the bridge output terminals 18 and the amplifier output supplies a controlled voltage Vb to the bridge input terminal 20. Both sensing resistors Rh and Ra are exposed to the air stream being measured. Current flowing through the flow sensing resistor Rh heats the resistor to increase its resistance while airflow past the resistor Rh removes heat to cool the resistor. The bridge values are selected so that the bridge will be balanced when the flow sensing resistor Rh is at a prescribed temperature differential above the ambient temperature. As airflow changes tend to result in resistor Rh changes, the bridge tends to unbalance and the amplifier 16 makes a correction in the applied bridge voltage to restore the resistor temperature differential and thus the bridge balance. The applied bridge voltage Vb therefore varies with airflow and is useful as a measure of mass airflow.

Figure 2:
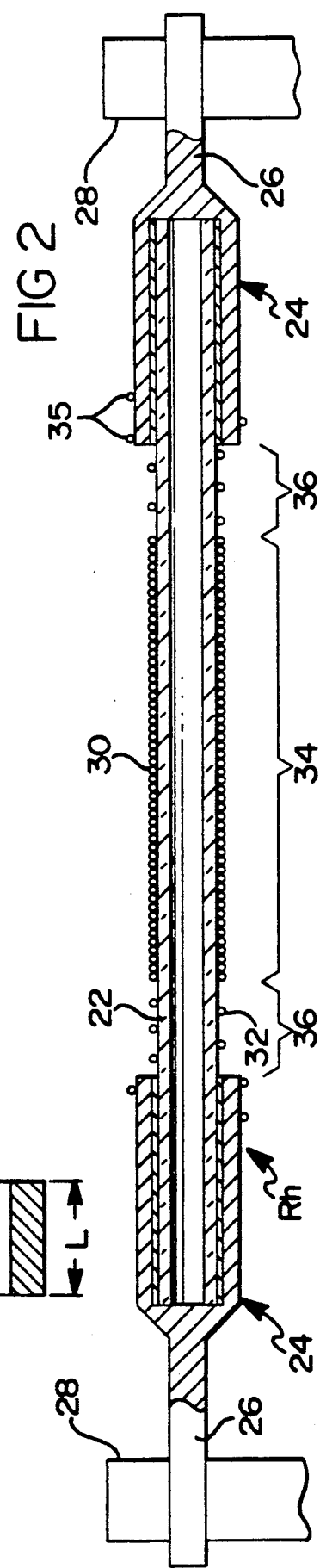
FIG. 2 is a cross section of a heated airflow sensor according to a first embodiment of the invention.

The flow sensing or heated resistor Rh is shown in FIG. 2. A tubular or hollow cylindrical substrate 22 having a low coefficient of thermal conductivity has a conductive end cap or terminal 24 adhesively secured to each end. The terminals 24 include leads 26 extending outboard of the sensor Rh for bonding to supports 28 which are also circuit conductors for supplying current to the sensor Rh. A heating coil 30 comprises a resistive wire 32 wrapped densely around the center of the substrate to define a heating zone 34; outboard of the heating zone each end of the wire is wrapped sparsely (with high pitch) about the substrate and terminates with end windings 35 wrapped around the terminal 24 to form isolation zones 36 between the heating zone 34 and the terminals 24. The end winding 35 may alternatively be wound on the substrate beneath the terminals 24. Due to the low thermal conductivity of the substrate 22 the isolation zones 36 prevent appreciable heat flow from the heating zone 34 to the terminals 24 and the supports 28. Since the few turns of wire 32 in the isolation zones 36 contribute little heat to the substrate 22, heat loss by the path is minimal. Thus the heat sink effect of the terminals is negated and the meter error at low flow rates is greatly reduced or eliminated.

Figure 3:
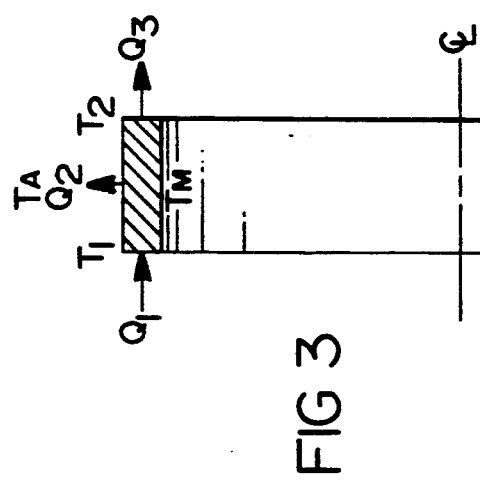
FIG. 3 is a cross section of an increment of the heated airflow sensor of FIG. 2 illustrating heat flow in the substrate.

An analysis of the heat flow is aided by reference to FIG. 3 which depicts an axial section 38 of a substrate isolation zone 36. The section 38 has a length L, a surface area As, and a cross-sectional area Ac. Heat is conducted axially into the section at the rate Q1, is convected out of the section at the rate Q2, and conducted axially out of the section at the rate Q3, such that $Q1 = Q2 + Q3$. The temperature of the segment on one end where heat Q1 enters is T1 and the opposite end is T2. The mean temperature of the segment is Tm and the air temperature is Ta. Then if h is a function of airflow rate, $Q2 = hAs(Tm - Ta)$. It can be shown that where k is the thermal conductivity of the substrate material, $Q3 = kAc(T1 - T2)/2L - Q2$. To minimize the heat flow Q3 toward the terminals it is apparent that this can be done by reducing the cross-sectional area Ac, reducing the coefficient of thermal conductivity k or increasing the length L.

A low coefficient of thermal conductivity is attained by using fused silica for the substrate. Fused silica has a coefficient of thermal conductivity of 1.7 W/mk (watts per meter Kelvin) at 373K compared to 29.0 W/mK at 373K for 99.5% alumina. Since the silica may have minute cracks which can lead to failure if moisture enters the cracks, it is sealed with a coating of polyimide which has a coefficient of thermal conductivity of 0.163 W/mK. The cross section is minimized by using a tubular substrate as shown in FIG. 2. The tube diameter is, for example, 0.76 mm, the wall thickness is 0.05 mm, the length is 17.1 mm, the heated zone is 9.7 mm long and each isolation zone is 1.7 mm long. The wire is a nickel alloy and has a 0.076 mm diameter with a 0.005 mm coating of polyimide. A terminal 24 on each end comprises an end cap covering 2 mm of the tube end. The heater element has a resistance of 3.75 ohms at operating temperature.

While a tubular substrate offers a low thermal cros section as well as low mass to aid in fast sensor response, a solid cylindrical rod, as shown in FIG. 4, can be used also. Due to the low coefficient of thermal conductivity, thermal loss to the terminals is acceptably low. The response time is not as high as in the tubular substrate but the rod has greater strength. In this example, the fused silica rod is 0.69 mm in diameter with a 0.03 mm thick polyimide coating and is 10 mm long, the heated zone is 3.7 mm long, each isolation zone 36 is 2 mm long and the ends are approximately 2 mm long. The wire is a nickel alloy and has a 0.033 mm diameter with a 0.005 mm polyimide coating. The end terminals 24 each comprise a coating of solder 0.1 mm thick covering the rod and the wire windings 35 in the end regions. The heated resistor has a resistance of 25 ohms.

An alternate embodimetn, as shown in FIG. 5, has the densely wound coil 30 of the heated zone 34 extending at least through the isolation zone 36 and optionally into the region covered by the terminal 24'. To prevent heating of the isolation zone 36 by the coil 30, each terminal 24' comprises a foil semicylindrical form 39 partially wrapped around the substrate and soldered to the end windings 35 and having a finger-like foil shunt 40 extending from each terminal form 39 to the coil 30 at the end of the heated zone 34. The shunt 40 bypasses the windings in the isolation zone so that no heating occurs there. The shunt, which preferably comprises nickel, has low electrical resistance but has sufficiently low thermal conductivity to minimize heat loss to the terminal 24. Tabs 41 on each side of the terminal 24' extends to a lead 42 and are welded there.

FIG. 6 illustrates still another embodiment wherein the coil 30 is replaced by a resistive layer 44 such as a platinum film on the substrate 22. In the heated zone 34, the layer 44 is cut in a spiral pattern 46 as by a laser to effect the desired high resistance value but in the isolation zones 36 the layer 44 is solid to minimize the resistance.

The embodiments of the invention in which an exclusive property or privilege is claimed are defined as follows:

1. A convection based airflow sensing element having a fast response comprising:
   a cylindrical substrate of low thermal conductivity material,
   electrical terminals attached to the ends of the substrate,
   a resistance heating element on the substrate between the terminals to define a heating zone, the heating element being spaced from the terminals to define an isolation zone between the element and each terminal, whereby the heating element directly heats the substrate in the heating zone and the isolation zones thermally insulate the directly heated substrate from the terminals, and
   means for electrically coupling the heating element to the terminals across the isolation zone,
   wherein the heating element comprises a wire coil densely wound on the substrate in the heating zone and the means for coupling the heating element to the terminals includes ends of the coil sparsely wound on the isolation zone.

2. A convection based airflow sensing element having a fast response comprising:
   a cylindrical substrate of low thermal conductivity material, electrical terminals attached to the ends of the substrate, a resistance heating element on the substrate between the terminals to define a heating zone, the heating element being spaced from the terminals to define an isolation zone betwen the element and each terminal, whereby the heating element directly heats the substrate in the heating zone and the isolation zones thermally insulate the directly heated substrate from the terminals, and means for electrically coupling the heating element to the terminals across the isolation zone, wherein the heating element comprises a coil wound on the substrate between the terminals including coil portions in the isolation zones and connected to the terminals, and wherein the means for coupling the heating element to the terminals across the isolation zone comprises an electrical short connected across each portion of the coil lying in the isolation zone for preventing significant heat generation in the coil portions in the isolation zones.

3. A convection based airflow sensing element having a fast response comprising:

a resistive heater coil, an elongated cylindrical substrate supporting the coil and heated thereby, terminal fittings for supporting the substrate and having the capacity to serve as a heat sink, thermal insulating means integral with the substrate and secured to the terminal fittings for mechanically coupling the fittings and substrate while impeding heat flow from the substrate to the fittings, and means for electrically connecting the heater coil to the terminal fittings, wherein the substrate and thermal insulating means are of one piece and comprise fused silica coated with polyimide, and the heater coil comprises a resistive wire coated with polyimide and wound on the substrate.

4. A convection based airflow sensing element having a fast response comprising:

a resistive heater coil, an elongated cylindrical substrate supporting the coil and heated thereby, terminal fittings for supporting the substrate and having the capacity to serve as a heat sink, thermal insulating means integral with the substrate and secured to the terminal fittings for mechanically coupling the fittings and substrate while impeding heat flow from the substrate to the fittings, and means for electrically connecting the heater coil to the terminal fittings, wherein the substrate and thermal insulating means are of one piece and comprise fused silica coated with polyimide, and the heater coil comprises a resistive film on the substrate.

5. A convection based airflow sensing element having a fast response comprising:

a cylindrical substrate of low thermal conductivity material, electrical terminals attached to the ends of the substrate, a resistance heating element on the substrate between the terminals to define a heating zone, the heating element being spaced from the terminals to define an isolation zone between the element and each terminal, whereby the heating element directly heats the substrate in the heating zone and the isolation zones thermally insulate the directly heated substrate from the terminals, and means for electrically coupling the heating element to the terminals across the isolation zone, wherein a single resistive film covers the substrate and is connected to each terminal, the film having a spiral high resistance pattern in the heting zone to comprise the resistance heating element and has a solid low resistance pattern in the isolation zones to comprise the means for coupling to the terminals.

* * * * *